US012018571B2

(12) United States Patent
Maldonado et al.

(10) Patent No.: US 12,018,571 B2
(45) Date of Patent: Jun. 25, 2024

(54) SEAL INSTALLATION TOOL

(71) Applicant: Raytheon Technologies Corporation, Farmington, CT (US)

(72) Inventors: Billie Rosalie Maldonado, Amesbury, MA (US); Alexander Rothchild, Saco, ME (US); Thomas Freeman, Kennebunk, ME (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/725,633

(22) Filed: Apr. 21, 2022

(65) Prior Publication Data

US 2022/0243611 A1 Aug. 4, 2022

Related U.S. Application Data

(62) Division of application No. 16/737,101, filed on Jan. 8, 2020, now Pat. No. 11,339,682.

(51) Int. Cl.

| | |
|---|---|
| ***F01D 25/00*** | (2006.01) |
| ***B25B 27/00*** | (2006.01) |
| ***B25H 3/00*** | (2006.01) |
| ***B25H 3/02*** | (2006.01) |

(52) U.S. Cl.
CPC ............. *F01D 25/00* (2013.01); *B25H 3/006* (2013.01); *B25H 3/02* (2013.01); *B25B 27/0028* (2013.01); *F05D 2230/60* (2013.01)

(58) Field of Classification Search
CPC ... F01D 25/00; B25B 27/0028; B25B 27/062; B25H 1/12
See application file for complete search history.

(56) References Cited

U.S. PATENT DOCUMENTS

| | | | | |
|---|---|---|---|---|
| 1,658,896 A * | 2/1928 | Hays | B25B 27/02 | 29/275 |
| 2,139,293 A * | 12/1938 | Wallgren | B25H 3/02 | 312/316 |
| 2,697,460 A * | 12/1954 | Barnett | B25H 3/023 | 206/349 |

(Continued)

FOREIGN PATENT DOCUMENTS

| | | |
|---|---|---|
| CN | 104626055 | 8/2016 |
| DE | 3601230 A1 | 8/1987 |

(Continued)

OTHER PUBLICATIONS

European Search Report for European Application No. 21150219.0 dated Jun. 2, 2021.

*Primary Examiner* — Michael W Hotchkiss
(74) *Attorney, Agent, or Firm* — Carlson, Gaskey & Olds, P.C.

(57) ABSTRACT

A method of installing a seal in a bore of a component includes, among other things, slidably orienting the component in a support fixture. The method includes securing a base plate to the component. The method includes arranging the seal onto a pusher. The method also includes inserting the pusher into a hole in the base plate. The method further includes installing a hub onto the base plate and over the pusher. The method further includes rotating a rod relative to the hub to advance the pusher and seat the seal in the bore.

10 Claims, 5 Drawing Sheets

(56) References Cited

U.S. PATENT DOCUMENTS

| | | | | | |
|---|---|---|---|---|---|
| 2,791,251 | A * | 5/1957 | Steele, Jr. | B25H 1/12 | 144/285 |
| 2,860,535 | A * | 11/1958 | Fowler | F16B 43/001 | 29/280 |
| 3,030,702 | A * | 4/1962 | Fowler | B25B 27/0028 | 29/280 |
| 3,092,902 | A * | 6/1963 | Fowler | B25B 27/0028 | 29/283 |
| 3,266,347 | A * | 8/1966 | Robertson | B25B 27/0028 | D8/47 |
| 3,401,445 | A | 9/1968 | Fritch | | |
| 3,851,756 | A * | 12/1974 | Brown | B25H 1/12 | 220/759 |
| 3,878,939 | A * | 4/1975 | Wilcox | B25H 3/023 | 312/200 |
| 3,981,066 | A | 9/1976 | Calvert | | |
| 4,155,609 | A * | 5/1979 | Skafte | B25H 1/12 | D6/555 |
| 4,256,294 | A * | 3/1981 | Hickman | B25H 1/04 | 206/349 |
| 4,303,158 | A * | 12/1981 | Perkins | A45C 11/24 | 312/902 |
| 4,378,828 | A * | 4/1983 | Shiminski | B25H 1/04 | 312/258 |
| 4,550,486 | A | 11/1985 | Yarimizu | | |
| 4,551,898 | A * | 11/1985 | Provost | B25B 27/0028 | 29/263 |
| 4,586,228 | A * | 5/1986 | Rodolf | B25B 27/0028 | 206/230 |
| 4,608,738 | A * | 9/1986 | Wood | B25B 27/023 | 29/264 |
| 4,836,374 | A * | 6/1989 | Hutchins | A45C 13/02 | 206/592 |
| 5,595,228 | A * | 1/1997 | Meisner | B25H 1/04 | 144/285 |
| 5,653,011 | A * | 8/1997 | Collins | B25B 27/06 | 269/319 |
| 5,709,018 | A * | 1/1998 | Dugan | B23P 19/084 | 29/263 |
| 5,855,274 | A * | 1/1999 | Piao | B25H 3/04 | 206/478 |
| 6,012,209 | A | 1/2000 | Whetstone | | |
| 6,065,198 | A * | 5/2000 | Vitous | B25B 27/0028 | 29/402.02 |
| 6,113,202 | A * | 9/2000 | Germano | B25H 1/12 | 312/244 |
| 6,484,391 | B1 * | 11/2002 | Dillon | B25B 27/06 | 29/898.07 |
| 7,472,730 | B2 * | 1/2009 | Adkins | B25H 3/023 | 144/287 |
| 7,771,144 | B1 | 8/2010 | Nader et al. | | |
| 7,779,762 | B2 * | 8/2010 | Sackman | A47B 13/081 | 108/38 |
| 7,900,357 | B2 * | 3/2011 | Hopper | F16J 15/3268 | 29/898.07 |
| 8,172,077 | B1 * | 5/2012 | Gray | B25H 3/023 | 190/18 R |
| 8,186,031 | B2 * | 5/2012 | Whitney | B25B 27/062 | 408/81 |
| 8,516,671 | B2 * | 8/2013 | Scheidenhelm | B25B 27/0028 | 29/818 |
| 9,150,048 | B2 | 10/2015 | Rodrigues-Morgado et al. | | |
| 9,174,331 | B1 * | 11/2015 | Coghlan | B25B 27/062 | |
| 9,555,539 | B2 * | 1/2017 | Lin | B25H 3/02 | |
| 9,914,209 | B2 * | 3/2018 | Grela | A47B 81/00 | |
| 9,969,069 | B2 | 5/2018 | Pergantis et al. | | |
| 10,213,913 | B2 * | 2/2019 | Pang | B25H 3/06 | |
| 10,807,221 | B2 | 10/2020 | McCarthy | | |
| 10,948,084 | B2 | 3/2021 | Minami | | |
| 2004/0112258 | A1 * | 6/2004 | Fichman | A47B 5/04 | 108/42 |
| 2006/0108245 | A1 * | 5/2006 | Lee | B25H 3/023 | 206/373 |
| 2008/0230999 | A1 * | 9/2008 | Hopper | F16J 15/3268 | 277/551 |
| 2010/0230313 | A1 * | 9/2010 | Allan | B25B 1/103 | 206/373 |
| 2010/0314978 | A1 * | 12/2010 | Manalang | B25H 3/06 | 312/317.3 |
| 2012/0066879 | A1 * | 3/2012 | Daeschner | B25B 11/02 | 29/800 |
| 2013/0160229 | A1 * | 6/2013 | Lin | B25H 1/20 | 15/268 |
| 2016/0207183 | A1 * | 7/2016 | Owens | B25B 27/062 | |
| 2016/0312656 | A1 * | 10/2016 | Pergantis | B25B 27/023 | |
| 2017/0341217 | A1 * | 11/2017 | Cole | B25H 3/028 | |
| 2018/0290288 | A1 * | 10/2018 | Brunner | B25H 3/02 | |
| 2019/0353182 | A1 | 11/2019 | Williamson et al. | | |

FOREIGN PATENT DOCUMENTS

| | | | |
|---|---|---|---|
| EP | 3756819 | A1 | 12/2020 |
| GB | 2226807 | A | 7/1990 |
| WO | 8605666 | A1 | 10/1986 |

* cited by examiner

SEAL INSTALLATION TOOL

CROSS REFERENCE TO RELATED APPLICATION

This application is a divisional of U.S. application Ser. No. 16/737,101 filed on Jan. 8, 2020.

BACKGROUND

The disclosure relates to an installation tool for installing a seal into a bore of a component.

In one example application, a bearing housing for a gas turbine engine includes a bore that receives a seal. An oil tube having a flange is bolted to a boss surrounding the bore such that the seal engages the oil tube. The seal can become damaged if alignment of the seal with respect to the bore is not maintained as the seal is pushed into the bore, creating a leak subsequent to assembly.

To ensure proper seal installation, various seal installation tools have been used. One example tool is a one-piece 3-D printed tool with an annular flange extending from a base, which entirely circumscribes the flange. The seal is arranged on the flange, and the base is carefully bolted to the boss, forcing the seal into the bore. However, the bolts must either be tightened simultaneously or each a little bit at a time to ensure the seal alignment is maintained.

Another seal installation tool includes a bracket that is secured to the boss using bolts. A handle is rotated to slide a block within the bracket. A separate seal pusher is arranged between the block through a hole in the bracket, which entirely circumscribes the hole. The seal is arranged on the pusher. Rotating the handle advances the pusher and seal into the bore.

Both of the typical seal installation tools do not provide any visibility to the seal during installation and are associated with various other drawbacks.

SUMMARY

In one exemplary embodiment, a method of installing a seal in a bore of a component includes, among other things, slidably orienting the component in a support fixture. The method includes securing a base plate to the component. The method includes arranging the seal onto a pusher. The method also includes inserting the pusher into a hole in the base plate. The method further includes installing a hub onto the base plate and over the pusher. The method further includes rotating a rod relative to the hub to advance the pusher and seat the seal in the bore.

In a further embodiment of any of the above, the method includes the step of opening a tool case and placing the component in the support fixture. The orienting step includes rotating the component about its axis to position the bore generally vertically.

In a further embodiment of any of the above, the component includes a perimeter flange. The orienting step includes sliding the flange within complementarily shaped groove in the support fixture.

In a further embodiment of any of the above, the securing step includes abutting a boss of the component with the base plate and the bore in the boss. The method includes a step of clamping the base plate to the boss by securing bolts to the base plate.

In a further embodiment of any of the above, the clamping step includes inserting the bolts from a side opposite the boss at an interior of the component.

In a further embodiment of any of the above, the securing step includes providing a window in the base plate that leaves the seal visible through the window subsequent to the inserting step.

In a further embodiment of any of the above, the method includes the step of observing longitudinal movement of the seal past the window toward the bore.

In a further embodiment of any of the above, the pusher includes first and second diameter portions that form a first shoulder. The arranging step includes sliding the seal onto the first diameter portion and into abutment with the first shoulder.

In a further embodiment of any of the above, the pusher includes a third diameter portion that forms a second shoulder with the second diameter portion. The hole includes a stop that abuts the second shoulder in a fully installed seal position.

In a further embodiment of any of the above, the pusher includes first and second pusher portions. The first and second diameter portions are provided on the first pusher portion. The third diameter portion is provided on the second pusher portion. The first and second pusher portions are secured to one another by a fastener.

In a further embodiment of any of the above, the rotating step slides the first diameter portion into the bore in a slip fit relationship.

In a further embodiment of any of the above, the installing step includes threading the hub onto a collar of the base plate and receiving an end of the rod in a pocket of the pusher in a slip fit relationship.

In a further embodiment of any of the above, the rotating step includes threadingly rotating the rod relative to the hub and tightening the rod until the second should contacts the stop.

In another exemplary embodiment, a seal installation tool includes, among other things, a tool case having a support fixture with a shaped groove that is configured to receive a component flange. The seal installation tool also includes a base plate having a hole. The base plate has a window that adjoins the hole. A pusher has first and second diameter portions that form a shoulder. The first diameter portion is configured to carry a seal against the shoulder. The pusher is arranged in the hole in a slip fit relationship. A hub is removeably secured to the base plate over the pusher. A rod is threadingly received by the hub for relative rotation thereto. An end of the rod cooperates with the pusher. The rod is configured to longitudinally slide the pusher relative to the base plate.

In a further embodiment of any of the above, the tool includes a tool tray that is arranged in the tool case over support fixture. The tool tray has cut-outs that removably hold the base plate and an assembly that includes the pusher, the hub and the rod.

In a further embodiment of any of the above, the base plate includes threaded holes that are configured to receive bolts that clamp the base plate to a component having a bore that receives the seal.

In a further embodiment of any of the above, the pusher includes a third diameter portion that forms a second shoulder with the second diameter portion. The hole includes a stop that abuts the second shoulder in a fully installed seal position.

In a further embodiment of any of the above, the pusher includes first and second pusher portions. The first and second diameter portions are provided on the first pusher portion. The third diameter portion is provided on the second pusher portion. The first and second pusher portions are secured to one another by a fastener. The first and second pusher portions are different materials.

In a further embodiment of any of the above, the pusher includes a pocket that receives an end of the rod in a slip fit relationship.

In a further embodiment of any of the above, the base plate includes a collar. The hub is threadingly secured to the collar.

In a further embodiment of any of the above, the seal is aligned with the window in an uninstalled seal position.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1A:
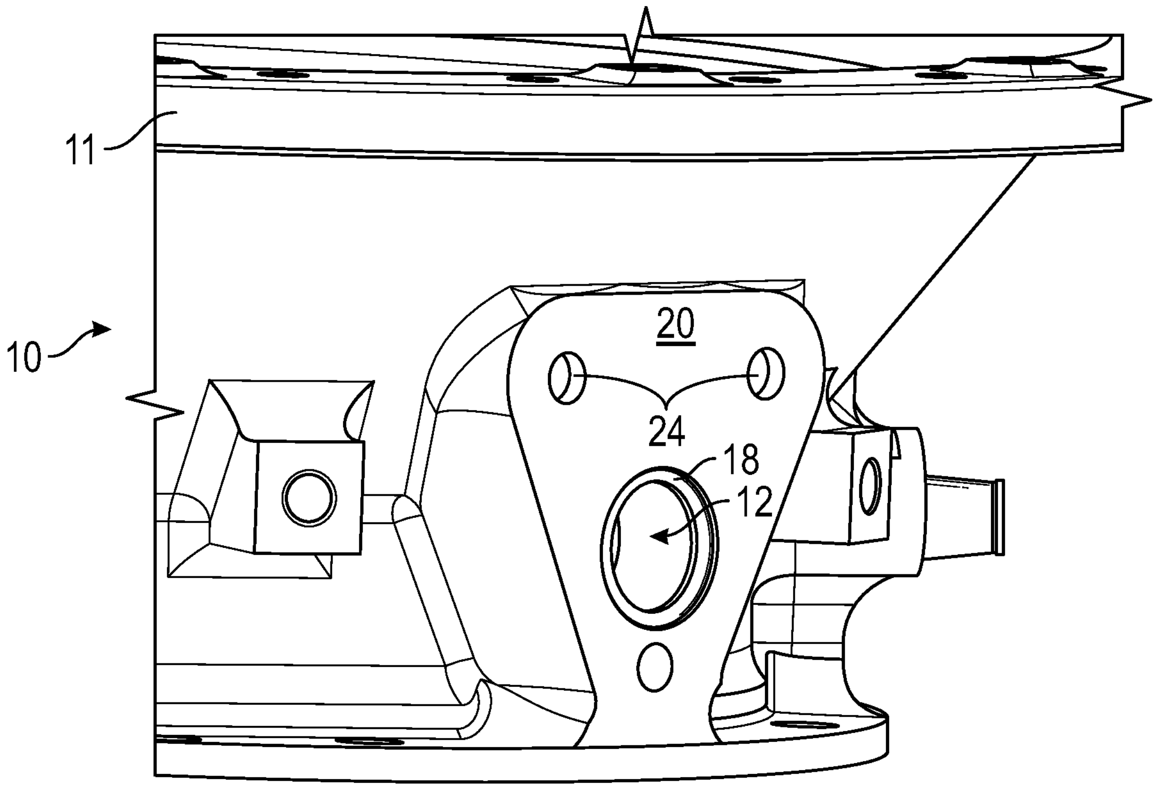
FIG. 1A is a perspective view of a component having a bore with a seal that is fully installed and seated.
Figure 1B:
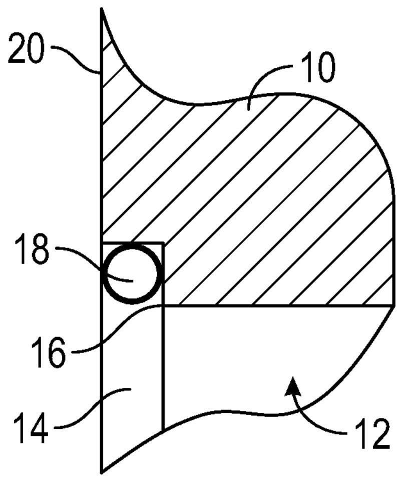
FIG. 1B is a cross-section through the bore and seal as shown in FIG. 1A.

Referring to FIGS. 1A and 1B, a component 10, such as a gas turbine engine bearing housing, includes a perimeter flange 11. One or more bores 12 in the component 10 are used to communicate a fluid such as lubricating oil to the interior of the component. The component 10 includes a boss 20 providing a flat surface to which an oil tube is secured at holes 24, which may be threaded or non-threaded. The bore 12 includes an annular recess 14 providing a shoulder 16. A seal 18 is inserted into the bore 12 and is a small distance away from the shoulder 16 when in a fully installed position.

A seal installation tool 26, which is included in a kit, is used to insert the seal 18 into the bore 12 while maintaining desired alignment, as shown in FIG. 2A, which mitigates potential damage to the seal 18 during installation. Even with using the disclosed tool 26 for seal installation, the seal 18 may still catch on the corner of the bore 12 and damage the seal 18.

Figure 2:
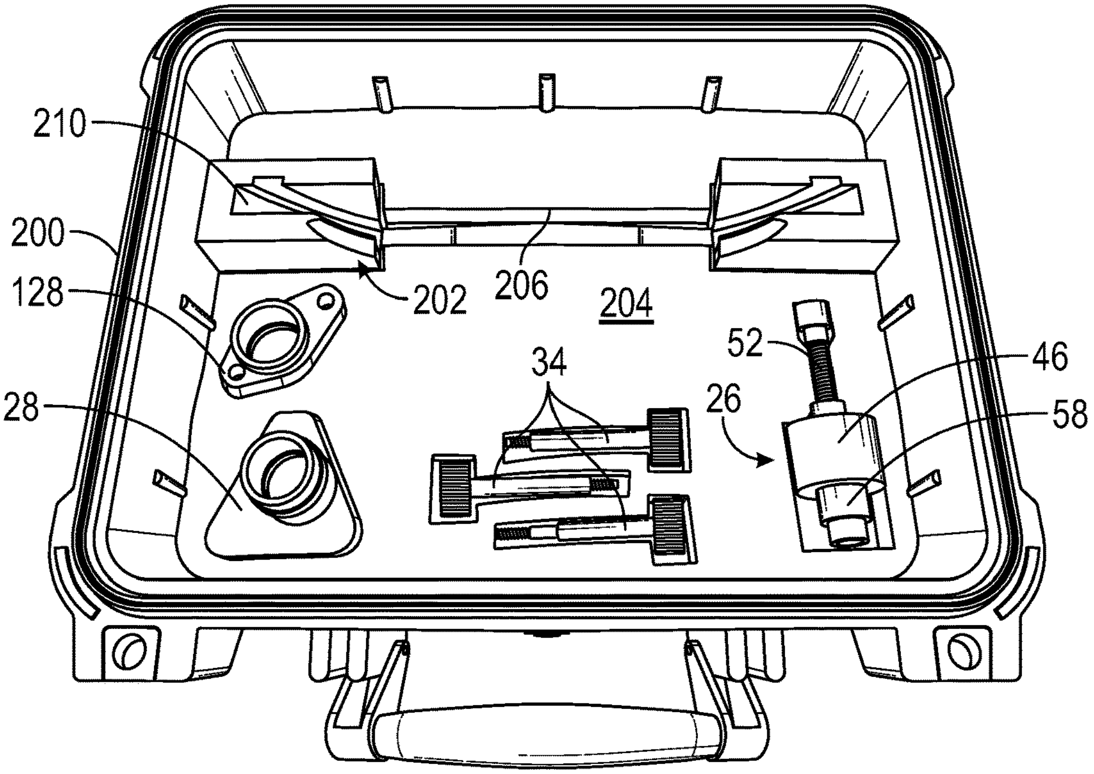
FIG. 2 illustrates a tool case with tools used to seal the seal in the bore.
Figure 3:
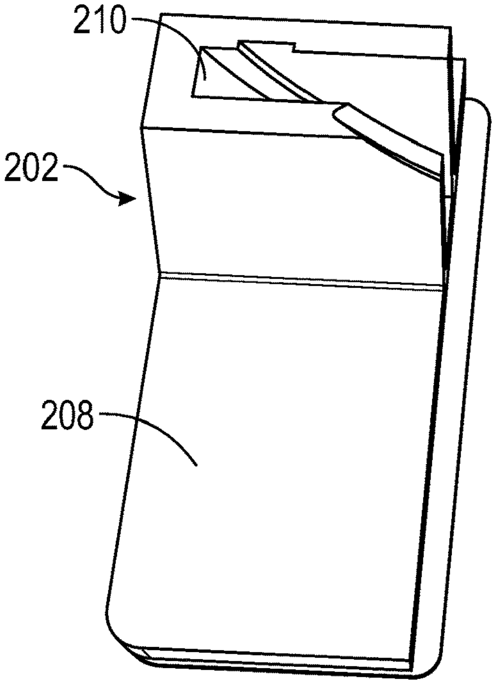
FIG. 3 depicts a portion of a support fixture used to orient the component during installation of the seal into the bore.
Figure 4:
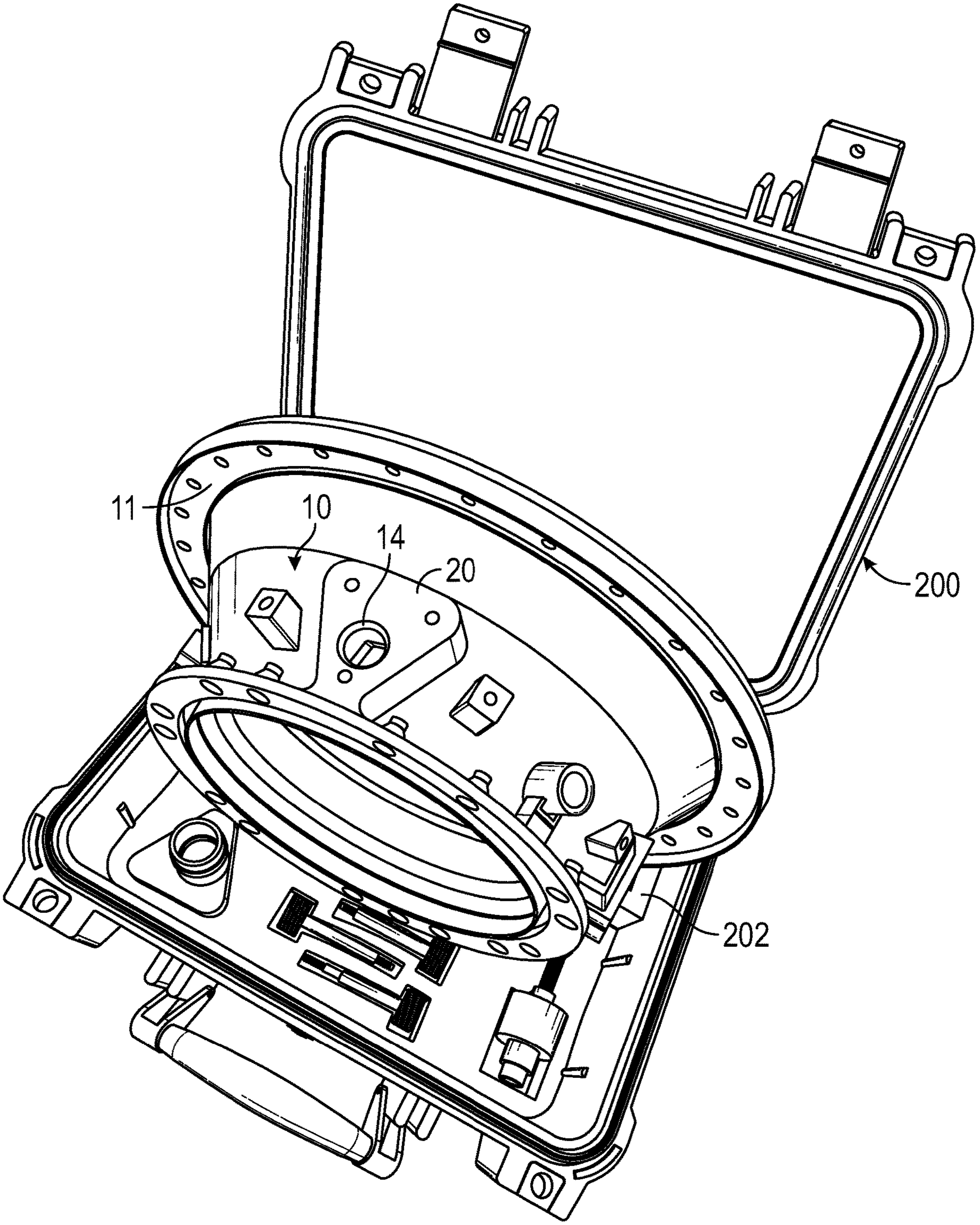
FIG. 4 shows the component mounted in the support fixture in a desired orientation prior to seal installation.

The seal installation kit is shown in FIGS. 2-4. The kit includes a tool case 200 that has the implements needed for damage-free seal installation. The tool case 200 has a support fixture 202 arranged within the case. The support fixture 202 has one or more legs 208 that extends from a base that provides a shaped groove 210. The legs 208 may be secured to the case 200 if desired. A foam shadow box or tool tray 204 is arranged over the legs 208, and the base extends through an opening 206 in the tool tray 204. The tool tray 204, which may be glued in place, has cut-outs in the shape of the various implements of the seal installation tool (e.g., tool 26, bolts 34, and base plates 28, 128).

The shaped groove 210 in the base receives the flange 11 in such a manner so as to permit rotation of the component 10 relative to the tool case 200. The legs 208 prevent the support fixture 202 from tipping over. As part of the seal installation procedure, the tool case 200 is opened, and the flange 11 is inserted into the complementarily shaped groove 210. The component 10 is rotated to orient the boss 20 and its bore 12 in a generally vertical orientation. This prevents the seal 18 from gravitating to one side if, for example, the bore was oriented horizontally, which could result in misalignment and damage to the seal 18.

Figure 5A:
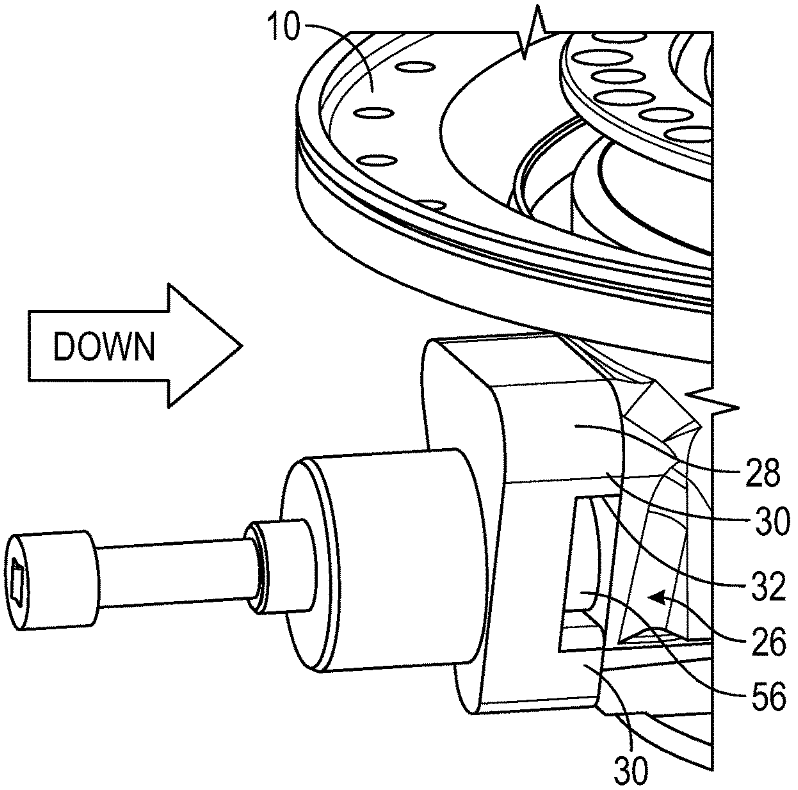
FIG. 5A is a perspective view of one example seal installation tool according to the disclosure.

Referring to FIG. 5A, the tool 26 includes a base plate 28 having standoffs 30 separated by a window 32 that provides an unobstructed view to an interior portion of the tool at an entrance to the bore 12. The seal 18 is mounted to a pusher 56 supported by the base plate 28. This window 32, provided on each of opposing sides of the base 28, for example, enables the operator to view the seal 18 as it moves longitudinally into the bore 12 during installation so that the seal 18 can be checked for proper alignment.

Figure 5B:
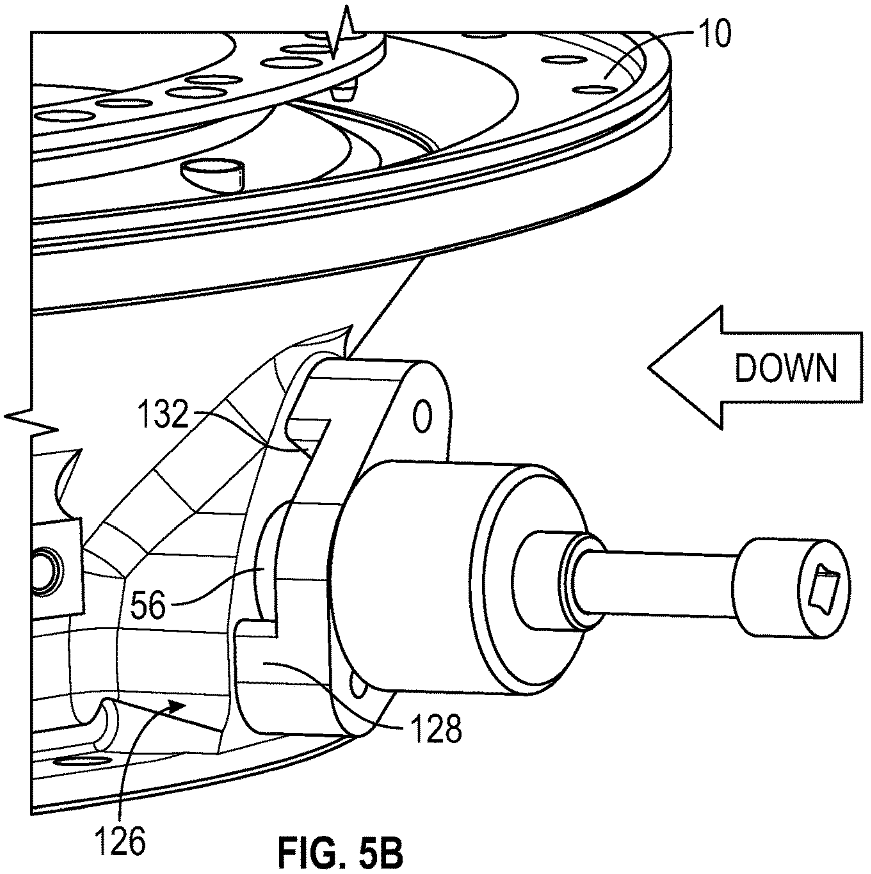
FIG. 5B is a perspective view of another example seal tool according to the disclosure with a different base plate than shown in FIG. 5A.

Another seal installation tool 126 having windows 132 is illustrated in FIG. 5B. The tool 126 uses a different base plate 128 than that of the seal installation tool 26. Otherwise, all of the remaining components may be interchangeable such that a kit containing multiple base plates for a particular component may be provided.

Figure 6A:
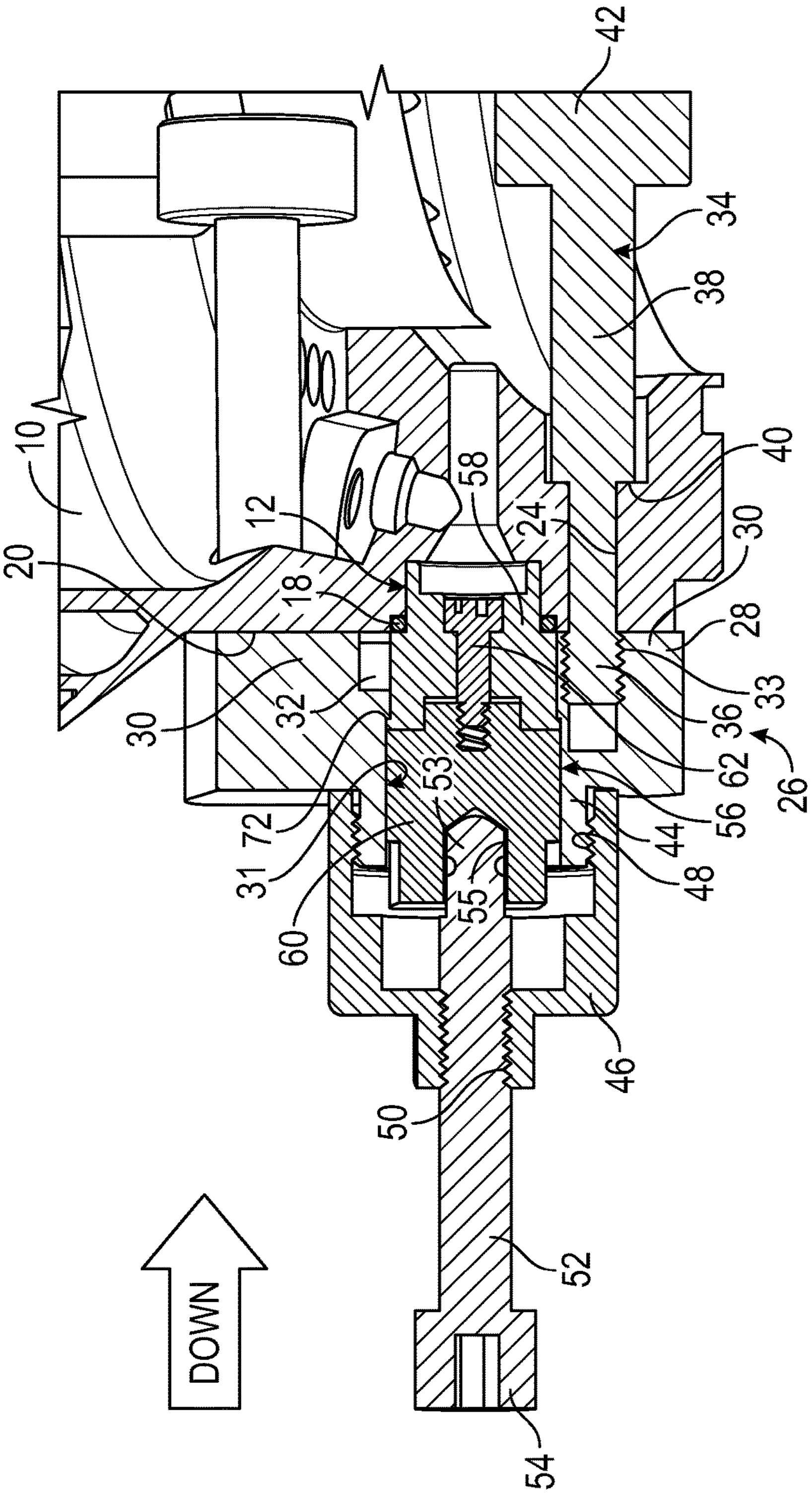
FIG. 6A is a cross-sectional view through the seal installation tool shown in FIG. 2A.

Referring to FIG. 6A, the base plate 28 includes a hole 31 that receives the pusher 56. The window 32 extends all the way to the hole 31 to provide visibility to an end of the pusher 56 on which the seal 18 is mounted. The base plate 28 is clamped to the boss 20 by bolts 34. A threaded end 36 of the bolts 34 is received in holes 33. A shank 38 on each bolt 34 has a shoulder 40 that engages a backside of the component 10. Knobs 42 may be provided on the bolts 34 to enable hand tightening by the operator.

A collar 44 is provided on the base plate 28, and a hub 46 is threadingly secured to the collar 44 at a threaded inner diameter 48 of the hub 46. The hub 46 encloses the pusher 56.

A rod 52 is threadingly received in a hole 50 of the hub 46 for relative rotation thereto. One end 53 of the rod 52 is received within a pocket 55 of the pusher 56 in a slip fit relationship. Another end 54 of the rod 52 is configured to cooperate with a tool, such as a torque wrench.

Figure 6B:
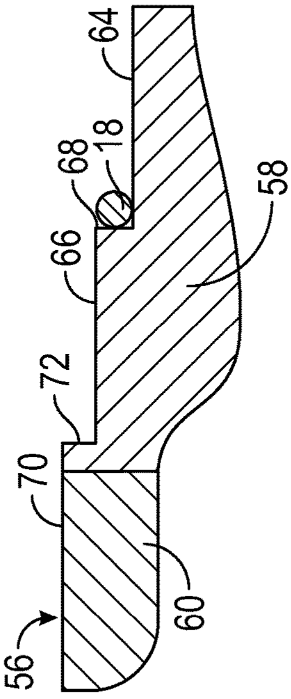
FIG. 6B is a partial cross-sectional view of a pusher shown in FIG. 6A.

Referring to FIGS. 6A and 6B, the pusher 56 includes first and second pusher portions 58, 60, which are secured to one another by a fastener 62 in the example. The pusher 56 includes first and second diameter portions 64, 66 that form a shoulder 68. The seal 18 is arranged on the first diameter portion 64 and in abutment with the shoulder 68. A third diameter portion 70 forms a second shoulder 72 with the second diameter portion 66. The hole 31 in the base plate 28 provides a stop 74 against which the second shoulder 72 abuts during full extension of the pusher 56.

During installation, the base plate 28 is secured to the component 10 using the bolts 34 to clamp the base plate 28 to the boss 20. In one example, the bolts 34 are inserted from a side opposite the boss 20 and the interior of the component 10.

The seal 18 is arranged onto the pusher 56. The pusher 56 is inserted into the hole 31 in the base plate 28, and the hub 46 is installed onto the collar 44 and over the pusher 56. At this point, the seal 18 is visible through the windows 32.

The rod 52 is rotated relative to the hub 46 to advance the pusher 56 and seat the seal 18 in the bore 12 while maintaining desired alignment. The end 53 of rod 52 spins freely within the pocket 55. During installation, the operator observes the seal 18 as it moves longitudinally past the window 32 and into the bore 12. The rod 52 is torqued by a tool (e.g., wrench) at the end 54 until it the shoulder 72 hits stop 74. This prevents the seal from rolling inward should the seal come in contact with the radius in the corner of shoulder 16. The torque measurement from the wrench is used to inform mechanic of potential damage to the seal. The tool 26 is removed from the boss 20, and proper seal installation can be confirmed.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A seal installation tool set comprising: a tool case having a support fixture provided by a fixed, non-adjustable shaped groove configured to receive a flange of a component with the support fixture remaining inside the tool case, wherein the shaped groove extends longitudinally between facing lateral surfaces, and the flange is configured to be in the shaped groove while the flange is longitudinally retained by the facing lateral surfaces, and the shaped groove and the flange being of complimentary shape such that the component may be rotated with its flange moving within the shaped groove; a base plate having a hole, the base plate having a window adjoining the hole; a pusher having first and second diameter portions that form a shoulder, the first diameter portion configured to carry a seal against the shoulder, the pusher arranged in the hole in a slip fit relationship; a hub removably secured to the base plate over the pusher; and a rod threadingly received by the hub for relative rotation thereto, an end of the rod cooperating with the pusher, the rod configured to longitudinally slide the pusher relative to the base plate; wherein the component is subject to a seal installation procedure using the seal installation tool set.

2. The tool set of claim 1, comprising a tool tray arranged in the tool case over the support fixture, the tool tray having cut-outs that removably hold the base plate and an assembly comprising the pusher, the hub and the rod.

3. The tool set of claim 1, wherein the pusher includes a pocket that receives an end of the rod in a slip fit relationship.

4. The tool set of claim 1, wherein the seal is aligned with the window in an uninstalled seal position.

5. The tool set of claim 1, wherein the seal is aligned with and visible through the window in an uninstalled seal position.

6. The tool set of claim 1, wherein the base plate includes threaded holes configured to receive bolts that clamp the base plate to the component having a bore receiving the seal.

7. The tool set of claim 6, wherein base plate includes a collar, and the hub is threadingly secured to the collar.

8. The tool set of claim 1, wherein the pusher includes a third diameter portion forming a second shoulder with the second diameter portion, and the hole includes a stop that abuts the second shoulder in a fully installed seal position.

9. The tool set of claim 8, wherein the pusher includes first and second pusher portions, the first and second diameter portions provided on the first pusher portion, and the third diameter portion provided on the second pusher portion, the first and second pusher portions secured to one another by a fastener, wherein the first and second pusher portions are different materials.

10. A seal installation tool set comprising: a tool case having a support fixture provided by a fixed, non-adjustable shaped groove configured to receive a flange of a component with the support fixture remaining inside the tool case, wherein the shaped groove extends longitudinally between facing lateral surfaces, and the flange is configured to be in the shaped groove while the flange is longitudinally retained by the facing lateral surfaces, and the shaped groove and the flange being of complimentary shape such that the component may be rotated with its flange moving within the shaped groove; a base plate having a hole, the base plate having a window adjoining the hole; a pusher having first and second diameter portions that form a shoulder, the first diameter portion configured to carry a seal against the shoulder, wherein the seal is aligned with and visible through the window in an uninstalled seal position, the pusher arranged in the hole in a slip fit relationship; a hub removably secured to the base plate over the pusher; and a rod threadingly received by the hub for relative rotation thereto, an end of the rod cooperating with the pusher, the rod configured to longitudinally slide the pusher relative to the base plate; wherein the component is subject to a seal installation procedure using the seal installation tool set.

* * * * *